July 17, 1923.

W. H. MAHLOW

DUMPING BODY

Filed April 25, 1922

WITNESSES

INVENTOR
William M. Mahlow
BY
ATTORNEYS

July 17, 1923.
W. H. MAHLOW
DUMPING BODY
Filed April 25, 1922       3 Sheets-Sheet 2

1,462,417

WITNESSES

INVENTOR
William M. Mahlow
BY
ATTORNEYS

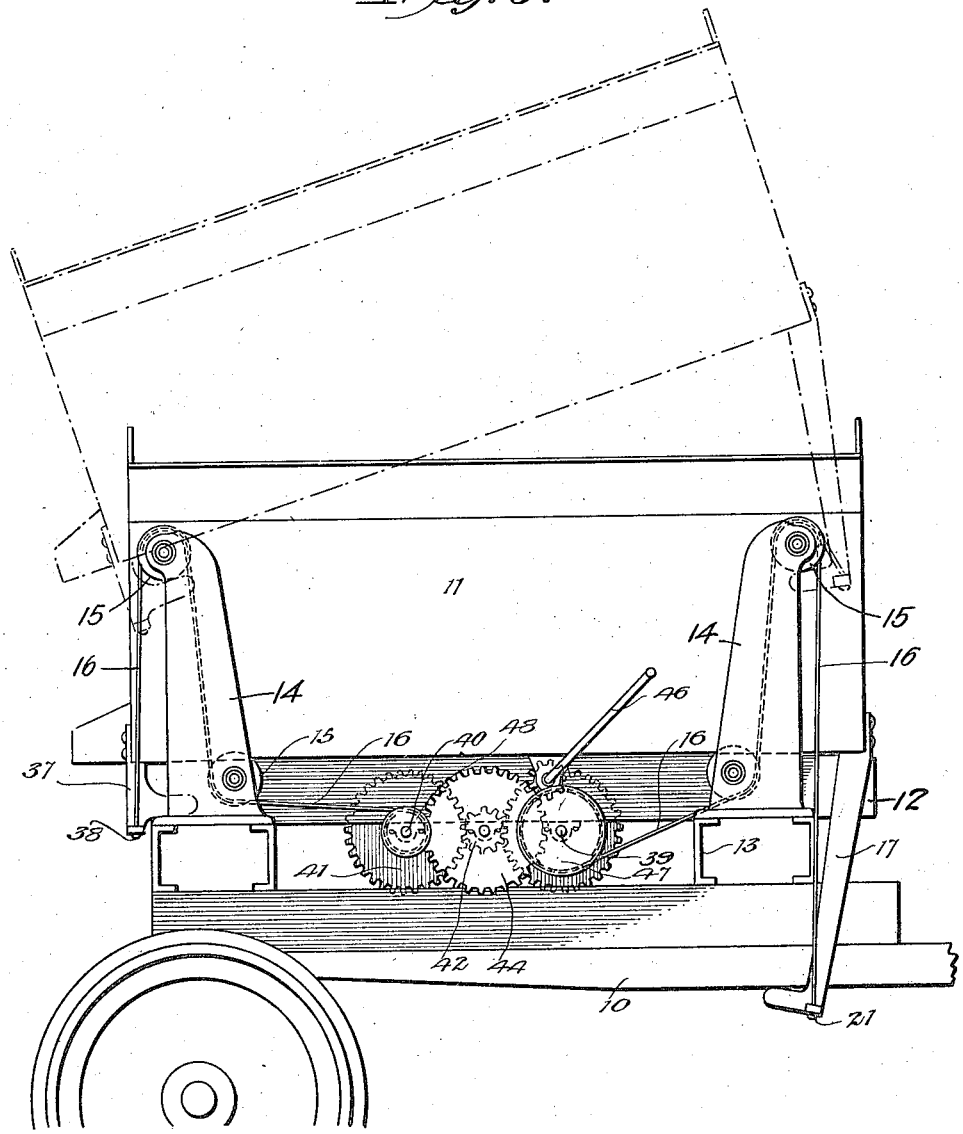

Patented July 17, 1923.

1,462,417

UNITED STATES PATENT OFFICE.

WILLIAM H. MAHLOW, OF TRENTON, NEW JERSEY.

DUMPING BODY.

Application filed April 25, 1922. Serial No. 556,437.

*To all whom it may concern:*

Be it known that I, WILLIAM H. MAHLOW, a citizen of the United States, and resident of Trenton, in the county of Mercer and State of New Jersey, have invented a new and Improved Dumping Body, of which the following is a full, clear, and exact description.

My invention relates to a dumping body, and aims to provide a device of this nature particularly adapted for use in connection with vehicles such as are utilized for the transportation of coal, sand, etc.

It is a primary object of this invention to provide a body capable of being moved with respect to the supporting member with which it is associated, so that it assumes a dumping position, this body being moved to this position by means of mechanism of extremely simple and rugged construction.

A further object of the present invention is to provide mechanism for the moving of the body with respect to the supporting member, which mechanism will serve to permit the body to be moved to a greater extent at one of its ends than at its opposite end.

With these and further objects in mind my present invention consists essentially in the provision of a mechanism which will be connected to the body, and to the supporting member therefor, this mechanism being capable of being actuated to move one or both ends of the body.

Reference is had to the attached sheets of drawings which illustrate practical embodiments of this invention, and it will be seen in these drawings, that—

Figure 1 is a side elevation of a body position upon a vehicle chassis and adapted to be moved by a mechanism of my improved construction.

Figure 5 is a view corresponding to Figure 1, the construction in this case however employing the mechanism shown in Figure 4.

Figure 2:
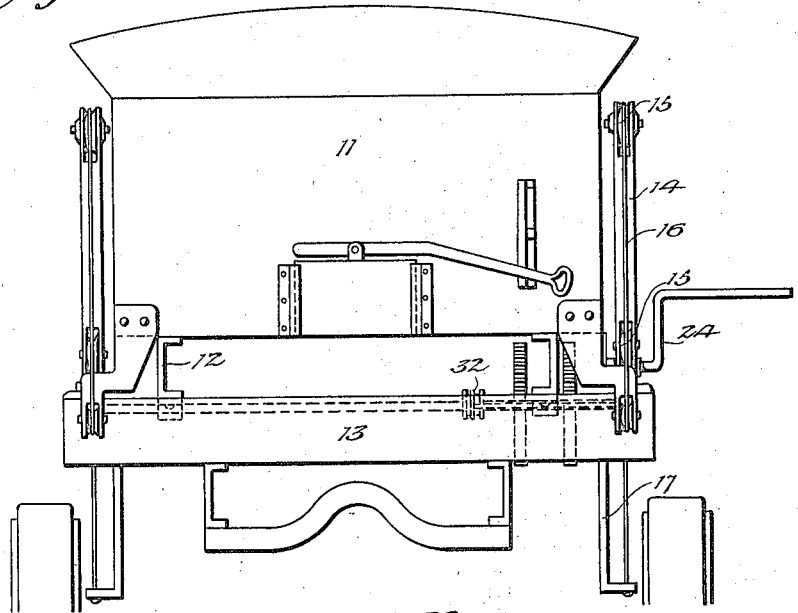
Figure 2 is a rear view of the same.

In the embodiment illustrated I have shown a dumping body associated with a vehicle, and thus the reference numeral 10 indicates the vehicle chassis which serves to support the body 11, the latter normally resting upon longitudinally extending beams 12, supported by transverse beams 13 mounted upon the chassis.

It is to be understood that the foregoing is more or less conventional construction and may be of any desired character. However, contrary to the usual construction it will be noted that the chassis also supports standards 14 arranged adjacent the ends of the body 11, and exteriorly of the same, and in Figures 1 to 3 these columns carry a plurality of pulleys 15 over which cables or similar flexible elements 16 pass. Further the body 11 carries adjacent its inner end a pair of arms 17, and a pair of pulleys 18 is positioned adjacent the outer end of the body 11. Also it will be noted that those cables 16 extending towards the rear of the body pass over the pulleys 15 carried by the columns 14, and thence around the pulleys 18 carried by the shoes 19, which latter are affixed to the body 11, the ends of these cables being finally attached as at 20 to the columns 14. Further, for a purpose hereinafter specified, it will be seen that the arms 17 extend to a point well below the body 11, and thus cables 16 which are connected to the lower ends of these arms, as at 21 are passed over the pulleys 15, carried by the columns 14 and downwardly to the lower ends of the arms.

Figure 3:
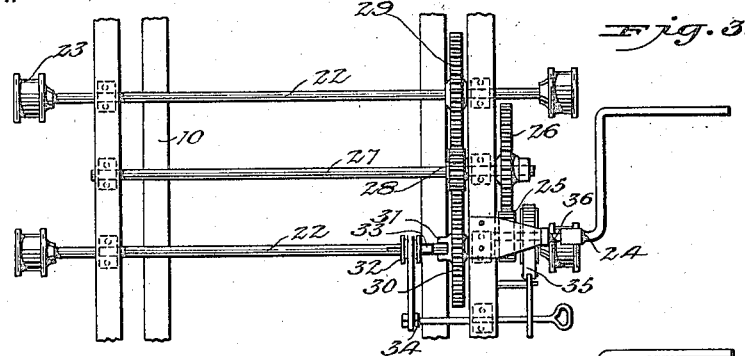
Figure 3 is a plan view showing the essential parts of the mechanism forming a part of the construction illustrated in Figures 1 and 2.

Now with a view of providing mechanism which will serve to exert a pull upon the various cables 16 it will be noted, reference being particularly had to Figure 3, that a pair of shafts 22 extend transversely of the vehicle chassis, and provide at their outer ends drums 23 around each of which one of the cables 16 is adapted to have its inner end coiled. A crank 24 may be utilized to effect a rotation of the gear 25, and this latter meshes with a relatively large gear 26 supported by the shaft 27 which also carries a smaller gear 28 meshing with larger gears 29 and 30 one on each of the shafts 22, the gear 29 being fixed on its shaft and the gear 30 being loose on its shaft.

Thus it will be understood that the gear wheels 25, 26, 28, 29 and 30 serve in aggregate as a reduction gearing, which will enormously enhance the power delivered to the crank 24, and also will obviously serve to exert a pull upon the cables resulting in the raising of the body. Attention is further invited to Figure 3 in which it will be noted that the gear wheel 30 preferably carries a clutch part 31, and a sliding collar 32 is keyed to the shaft 22 and carries a clutch part 33 adapted to co-operate with the clutch part 31, a coupling or uncoupling of these parts being effected by any suitable operating means such as by providing a shift lever 34 which has one of its ends attached to the collar 32, and it will be noted that a brake 35 of any desirable construction is preferably associated with the shaft 36, rotated by the crank. In operation, assuming that it is desired to raise both ends of the body 11 and to raise the inner end of the same beyond the plane into which the outer end of this body extends, as in the position indicated in dotted lines and identified by the reference character "A" in Figure 1, it will primarily be understood that the clutch parts 33 and 31 are shifted into engaged position. This locks the gear 30 to its shaft 22 and so both drums on said shaft now turn with the shaft. The crank 25 may now be turned, and incident to the fact that the clutch parts are connected it will be appreciated that this turning will result in both shafts 22 and the drums 23 carried thereby being rotated. It will primarily be noted that when the parts are actuated in this manner, the outer end of the body 11 will only be raised one half the distance through which the inner end of the body is moved. This is to be predicated to the fact that the set of cables associated with the outer end of the body, after passing around the pulleys 15 also passes around the pulleys 18, and has its ends connected to the columns, while the cables associated with the inner end of the body have their ends directly connected, as at 21, to the arm 17 after passing around the pulleys 15. Thus upon the parts being operated in this manner the body will be raised in its entirety, and also tilted to assume the position "A" indicated in dotted lines in Figure 1.

In the event, however, that it is found desirable to tilt the body at a more acute angle, or in the event that the outer end of the same is to remain in a relatively fixed plane, it will be noted that the desired object may be accomplished by simply moving the lever 34 to dis-engage the clutch parts. Upon this occurring it will be obvious that the shaft 22 with which the collar 32 is associated, will not be rotated upon the crank being actuated, and thus those cables which pass around the drums 23 carried by this shaft, will not have a pull exerted upon them. Further, those cables which are attached to the inner edge of the body 11 will be positioned in the usual manner, and subsequently moved so that by means of the connections aforementioned the inner end of the body will be raised and tilted, and the body will then assume the position indicated by the reference letter "B" and shown in dotted lines in Figure 1. In any instance upon the body being lowered from either the position "A" or "B" it will be understood that any injury of the parts may be prevented by the utilization of the brake 35 which will enable an operator to cushion any shock which might occur upon the body assuming its seated position.

Figure 4:
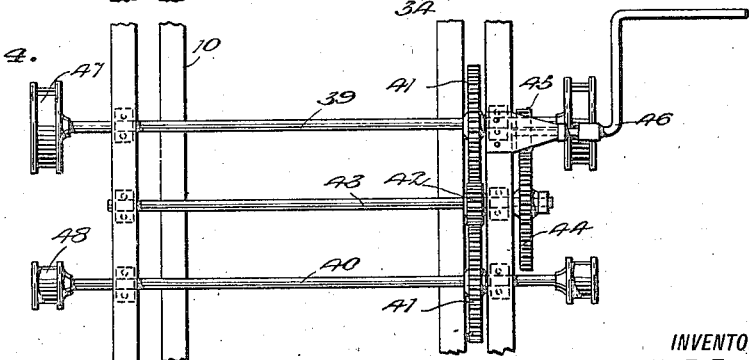
Figure 4 is a view similar to Figure 3 but showing a slightly different form of mechanism.

Referring now to the construction illustrated in Figures 4 and 5 it will be seen that virtually the same function is accomplished as that derived by the use of the structure illustrated in the preceding figures, and in this instance the reference numeral 10 also indicates the chassis supporting the body 11 by means of the beams 12, and 13. Also in this instance standards 14 are supported by the chassis 10 and provided with pulleys 15 over which cables 16 are adapted to pass to effect a raising of the body in a manner hereinafter described.

However, although those cables extending towards the forward or inner end of the body 11 are attached to the arms 17 as at 21, in the same manner as in the preceding figures, it will be seen that the cables 16 extending towards the rear end of the body 11 are attached directly to the shoes 37, as has been indicated at 38, thus it will be obvious that an equal pull upon both sets of cables will result in an equal lifting of both ends of the body. Further, to perform the functions desired, it will be noted, reference being had to the mechanism illustrated in Figure 4 that a pair of driving shafts 39 and 40 extend transversely of the chassis, and have gears 41 attached to their bodies. These gears, which are relatively larger, mesh with a smaller gear 42 mounted upon a counter-shaft 43, and the latter, also carries a gear 44 meshing with a gear 45, which is adapted to be turned by any suitable means such as a crank 46. Thus, as in the previous construction, a train of gears is provided which acts as a reduction gearing, and it will be obvious that upon the hand crank 46 being rotated, that the shafts 39 and 40 will be moved to an appropriate extent. Further, contrary to previous construction the shaft 39 carries relatively large drums 47, adjacent its ends, while the shaft 40 carries smaller drums 48, the ratio of these drums preferably being two to one.

Now as in Figure 5, the different sets of cables 16 are connected to the drums 47 and 48 respectively, and it will be understood that upon the shafts 39 and 40 being rotated in the manner aforementioned that the drums 47 and 48 will serve to wind up the inner end of these cables, thus exerting a pull upon the latter, and causing the body 11 to be elevated. However, incident to the fact that the drums 47 are larger than the drums 48 it will be appreciated that those cables associated with the former drums will be moved more rapidly than the cables encircling the drums 48, and thus that end of the body to which the first named cables are connected will be raised to a greater extent than the opposite end of the body, as has been indicated in dotted lines in Figure 5.

Thus the same result is accomplished as by the structure illustrated in Figures 1 to 3, but it will be appreciated that the last described structure might be more desirable in certain adaptations than the first named structure, it being finally understood that numerous modifications of structure and rearrangement of parts may be resorted to without in the least departing from the scope of my invention as defined in the claims; which are—

1. A dumping body including a support, a body positioned upon said support, and means for elevating the opposite ends of the body to different levels comprising elevating cables engaging opposite ends of the body, said body being provided adjacent one end with arms projecting below the bottom of the body to the lower ends of which arms are connected the cables engaging that end of the body, means connected to the inner ends of all the cables for retracting the cables, and guiding means for said cables including standards secured to said support and arranged adjacent to the ends of said body, and pulleys on said standards near the tops thereof over which said cables are passed.

2. The dumping body defined in claim 1, wherein said means connected to the inner ends of the cables includes a plurality of winding drums, means for rotating one of the drums, and means for coupling the other drum at will for simultaneous rotation with the first-mentioned drum.

3. A dumping body including a support, a body positioned upon said support, standards secured to said support and arranged adjacent to the ends of said body, arms carried adjacent one of the ends of the body and extending below the same, pulleys connected to the opposite end of the body, further pulleys carried by said standards, cables, means connected to the inner ends of said cables to exert a pull upon all of the same, said cables being divided into two sets, the outer ends of one set being connected to the lower ends of said arms and passing over the pulleys carried by the standards arranged adjacent this end of the body, the second set of cables being disposed over the pulleys carried by the opposite standards, and having their ends attached to said standards, their bodies also passing over the pulleys carried by said dumping body.

4. A dumping body including a support, a body positioned upon said support, standards secured to said support and arranged adjacent to the ends of said body, arms carried adjacent one of the ends of the body and extending below the same, pulleys carried by said standards, cables, windlass means connected to the inner ends of said cables to exert an even pull upon all of the same, said cables being divided into two sets, the outer ends of one set being connected to the lower ends of said arms and passing over the pulleys carried by the standards arranged adjacent this end of the body, the second set of cables being disposed over the pulleys carried by the opposite standards and having their ends attached to said standards, their bodies also passing over the pulleys carried by said dumping body.

WILLIAM H. MAHLOW.